US011174883B2

(12) United States Patent
Tokunaga et al.

(10) Patent No.: US 11,174,883 B2
(45) Date of Patent: Nov. 16, 2021

(54) LASER WELDED JOINT AND METHOD OF PRODUCTION OF SAME

(71) Applicant: NIPPON STEEL & SUMITOMO METAL CORPORATION, Tokyo (JP)

(72) Inventors: Masatoshi Tokunaga, Tokyo (JP); Hiroki Fujimoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 311 days.

(21) Appl. No.: 15/522,035

(22) PCT Filed: Oct. 30, 2015

(86) PCT No.: PCT/JP2015/080814
§ 371 (c)(1),
(2) Date: Apr. 26, 2017

(87) PCT Pub. No.: WO2016/068319
PCT Pub. Date: May 6, 2016

(65) Prior Publication Data
US 2017/0314595 A1    Nov. 2, 2017

(30) Foreign Application Priority Data

Oct. 30, 2014 (JP) .............................. JP2014-221951

(51) Int. Cl.
*B23K 26/00* (2014.01)
*F16B 5/08* (2006.01)
(Continued)

(52) U.S. Cl.
CPC ................ *F16B 5/08* (2013.01); *B23K 26/21* (2015.10); *B23K 26/211* (2015.10);
(Continued)

(58) Field of Classification Search
CPC .......... B23K 2101/006; B23K 2103/04; B23K 2103/08; B23K 2103/52; B23K 26/21; B23K 26/211; B23K 26/322; F16B 5/08
(Continued)

(56) References Cited

U.S. PATENT DOCUMENTS 3,969,604 A    7/1976  Baardsen
4,097,287 A *  6/1978  Ito ............................ C09D 1/00
                                                        106/14.14
(Continued)

FOREIGN PATENT DOCUMENTS

JP         59-150683 A    8/1984
JP       2002-144066 A    5/2002
(Continued)

OTHER PUBLICATIONS

Russian Office Action and Search Report, dated Jun. 27, 2018, for corresponding Russian Application No. 2017118448/02(031887).
(Continued)

*Primary Examiner* — Sang Y Paik
(74) *Attorney, Agent, or Firm* — Birch, Stewart, Kolasch & Birch, LLP

(57) ABSTRACT

A laser welded joint improving the tensile shear strength without causing an increase in the welding time and without using an expensive remote laser head, that is, a laser welded joint obtained by arranging metal sheets overlaid and welding them by a laser beam from the overlaid direction, wherein when a total thickness of the metal sheets welded overlaid is "t" (mm), the width of the weld metal at the joined interface is 0.6t1/3+0.14 (mm) or more.

2 Claims, 3 Drawing Sheets

(51) Int. Cl.
*B23K 26/21* (2014.01)
*B23K 26/211* (2014.01)
*B23K 103/08* (2006.01)
*B23K 26/322* (2014.01)
*B23K 103/04* (2006.01)
*B23K 103/00* (2006.01)
*B23K 101/00* (2006.01)

(52) U.S. Cl.
CPC ...... *B23K 26/322* (2013.01); *B23K 2101/006* (2018.08); *B23K 2103/04* (2018.08); *B23K 2103/08* (2018.08); *B23K 2103/52* (2018.08)

(58) Field of Classification Search
USPC .......................................... 219/121.6–121.86
See application file for complete search history.

(56) References Cited

U.S. PATENT DOCUMENTS

| | | | | |
|---|---|---|---|---|
| 4,957,594 | A * | 9/1990 | Yamazaki | C25D 3/565 205/177 |
| 5,599,395 | A * | 2/1997 | Olashuk | C23G 1/36 118/405 |
| 6,359,252 | B1 * | 3/2002 | Sanjeu | B23K 15/0053 219/121.64 |
| 2001/0003227 | A1 | 6/2001 | Feikus | |
| 2002/0033160 | A1 | 3/2002 | Feikus | |
| 2002/0153359 | A1 | 10/2002 | Feikus | |
| 2008/0035615 | A1 * | 2/2008 | Li | B23K 26/32 219/121.63 |

FOREIGN PATENT DOCUMENTS

| | | |
|---|---|---|
| JP | 2003-88969 A | 3/2003 |
| JP | 2003-94184 A | 4/2003 |
| JP | 2003-94184 A | 4/2003 |
| JP | 2003-334687 A | 11/2003 |
| JP | 2010-12504 A | 1/2010 |
| JP | 2010-89138 A | 4/2010 |
| JP | 2010-158717 A | 7/2010 |
| JP | 2013-215755 A | 10/2013 |
| JP | 2013-215755 A | 10/2013 |
| RU | 2212472 C2 | 9/2003 |

OTHER PUBLICATIONS

Extended European Search Report, dated Jul. 20, 2018, for corresponding European Application No. 15854280.3.
Perret, "Welding Simulation of Complex Automotive Welded Assembly—Possibilities and Limits of the Application of Analytical Temperature Field Solutions," vol. No. 108, BAM, Berlin, Jan. 1, 2013, XP002782836, (5 pages total).
Korean Office Action dated May 15, 2019, for corresponding Korean Application No. 10-2017-7010870.
International Search Report for PCT/JP2015/080814 dated Feb. 2, 2016.
Written Opinion of the International Searching Authority for PCT/JP2015/080814 (PCT/ISA/237) dated Feb. 2, 2016.
Indian Office Action for corresponding Indian Application No. 201717014598, dated Nov. 19, 2019, with English translation.
Brazilian Office Action for corresponding Brazilian Application No. BR112017007552-0, dated Oct. 1, 2019, with English translation.

* cited by examiner

LASER WELDED JOINT AND METHOD OF PRODUCTION OF SAME

TECHNICAL FIELD

The present invention relates to a laser welded joint improving the joint strength and a method of production of the same, more particularly relates to a laser welded joint improving the joint strength of a member for automotive use.

BACKGROUND ART

Spot welding is widely spreading as a welding method for automobile members, household electrical appliances, etc. However, with spot welding, it is necessary to press the materials between top and bottom electrodes to weld them, so space is required for insertion of electrodes above and below the welding locations. For this reason, there are the defects that spot welding is not suitable for single sided welding and, further, the shapes of the products welded are restricted. Further, spot welding is intermittent welding, so compared with line welding, there is the problem that the rigidity falls. Furthermore, spot welding is not suitable to welding of locations where air-tightness is required.

As opposed to this, laser beam welding differs from such resistance spot welding where the steel sheets are sandwiched between electrodes in that welding from one side and much smaller flanges become possible. Further, the welding is linear, so there is the feature that higher rigidity of the member becomes possible. There are therefore examples where laser beam welding is used instead of spot welding.

The heat source in laser beam welding is a focused laser beam. A laser beam is comprised of light of a single wavelength and no phase differences, so can be focused on an extremely small point by an optical lens to obtain high density energy. With laser beam welding, by utilizing the focused high energy density heat source, high speed welding with deep penetration becomes possible.

Laser beam welding is a highly efficient welding method. Further, it uses a laser beam as a heat source, so enables more reliable and easier control of the input heat compared with TIG welding, MIG welding, and other arc welding. For this reason, it is possible to suitably set the welding speed, the irradiated output of the laser beam, the flow rate of the shield gas, and other welding conditions. Furthermore, in laser beam welding, at the time of welding, the weld metal becomes melted extremely locally, so the effect of the heat applied to the matrix material is also small and it is possible to obtain a high quality welded joint with little strain or deformation.

In recent years, in response to the demands for improvement of the fuel efficiency of automobiles and enhancement of safety etc., high strength thin-gauge steel sheets have been used in large amounts in automobile bodies. In particular, in the method of overlaying and welding steel sheets, achievement of both lighter weight of the car body and improved impact safety is aimed at. A laser welding method giving better strength of the joined parts has been desired.

PLTs 1 and 2 disclose laser welding methods obtaining excellent joint strengths.

PLT 1 discloses again performing laser welding at the side of a weld zone securing joint strength of the welded joint to temper the heat affected zone of the weld zone and make the hardness of the heat affected zone 90% or less of the hardness of the heat affected zone of the weld zone laser beam welded again so as to improve the tensile shear strength.

PLT 2 discloses that the joint strength falls in the region of a crater formed at a weld toe and that by using a remote laser head to form preliminary weld bead at a part of the scheduled welding location, forming a main weld bead from an opposite direction to the direction of formation of the preliminary weld bead, and pushing the swelling of the weld bead formed by the preliminary weld bead into the crater formed by the preliminary weld bead, formation of a crater of excessive depth at the main weld bead is prevented.

In the art shown in PLT 1, it is necessary to weld close locations two times, so there is the problem that the welding time increases. In the art disclosed in PLT 2, it is necessary to weld the same location two times, so in addition to the problem of an increased welding time, it is necessary to use an expensive remote laser head, so there is the problem that the cost of production increases.

CITATION LIST

Patent Literature

PLT 1: Japanese Patent Publication No. 2010-012504A
PLT 2: Japanese Patent Publication No. 2013-215755A

SUMMARY OF INVENTION

Technical Problem

The present invention, in view of the above situation in the prior art, has as its object the provision of a laser welded joint and method of production of the same improving the tensile shear strength without causing an increase in the welding time and without using an expensive remote laser head.

Solution to Problem

The inventors studied intensively a method for solving the above problems. In general, the shear strength of a weld zone can be improved by increasing the width of the weld zone.

The inventors took note of the fact that increasing the width of the weld zone around the overlaid parts of the sheets in particular is effective for improving the tensile shear strength and discovered the method of conversely proactively utilizing the zinc, which previously had caused spatter and which had been considered harmful in welding, so as to enlarge the width of the melted part.

The present invention is a result of studies conducted based on these discoveries and has as its gist the following:

(1) A laser welded joint obtained by arranging metal sheets overlaid and welding them by a laser beam from the overlaid direction, wherein when a total thickness of the metal sheets welded overlaid is "t" (mm), the width of the weld metal at the joined interface is $0.6t^{1/3}+0.14$ (mm) or more.

(2) The laser welded joint according to (1) wherein a width of weld metal at the joined interface is larger than the widths of weld metals at the front surface and back surface of the metal sheets welded overlaid.

(3) A method of production of a laser welded joint obtained by arranging metal sheets overlaid and welding them by a laser beam from the overlaid direction, the method of production of a laser welded joint comprising the steps of forming a layer of a metal or metal compound with a boiling point higher than a melting point of the metal sheets at a scheduled welding location on one surface of a metal sheet, overlaying another metal sheet on the layer of a metal or metal compound, and laser welding them by irradiating a laser beam from an overlaid direction of the steel sheets so that regions including the layer of a metal or metal compound melt.

(4) The method of production of a laser welded joint according to (3), wherein the layer of a metal or metal compound is formed by coating a powder of the metal or metal compound.

(5) The method of production of a laser welded joint according to (3) or (4), wherein the metal or metal compound is a metal oxide.

(6) The method of production of a laser welded joint according to (5), wherein the metal oxide is zinc oxide.

(7) The method of production of a laser welded joint according to any one of (3) to (6), wherein a thickness of the layer of a metal or metal compound is $0.06t^{1/2}$-$0.01$ (mm) or less when a total thickness of the metal sheets arranged overlaid is "t" (mm).

Advantageous Effects of Invention

According to the present invention, it is possible to improve the tensile shear strength of a laser welded joint without using an expensive remote laser head, but using a usual laser welding machine and without causing an increase in the welding time.

BRIEF DESCRIPTION OF DRAWINGS

FIGS. 1(a) and 1(b) are views showing images of cross-sectional photos of weld zones obtained by laser welding steel sheets from the overlaid direction, wherein FIG. 1(a) shows the image of a cross-sectional photo of a weld zone of a weldable assembly comprised of steel sheets between which a zinc oxide layer is formed while FIG. 1(b) shows the image of a cross-sectional photo of a weld zone of a weldable assembly comprised of steel sheets between which no zinc oxide layer is formed.

DESCRIPTION OF EMBODIMENTS

In laser beam welding, if irradiating a laser beam at metal sheets, the steel sheets melt and vaporize whereby a keyhole is formed. As a force widening the keyhole, there is the pressure of metal vapor. As a force making the keyhole contract, there is surface tension of the molten metal. A keyhole is maintained by a balance of the two.

If locally raising the pressure inside the keyhole near the joined interface, the melted part can be broadened in width. That is, if the amount of vaporization of metal near the joined interface increases over that of other parts of the keyhole, the pressure will increase, the molten metal can be pushed out into the clearance between the metal sheets, and the width of the molten metal at the joined interface can be broadened.

The inventors studied means for broadening the width of the molten metal at the joined interface in welding steel sheets. As a result, the inventors came up with the idea of placing a metal or metal compound (below, referred to as a "metal member") which breaks down and vaporizes in molten metal at a scheduled welding location between the steel sheets and performing laser beam welding so as to supply vaporized particles of the metal member to the vicinity of the joined interface.

Further, they used metal members comprised of zinc oxide, prepared weldable assemblies comprised of overlaid steel sheets between which a zinc oxide layer was formed and weldable assemblies comprised of overlaid steel sheets between which no zinc oxide layer was formed, and welded them by laser beam to investigate the effects of a zinc oxide layer.

Figure 1:
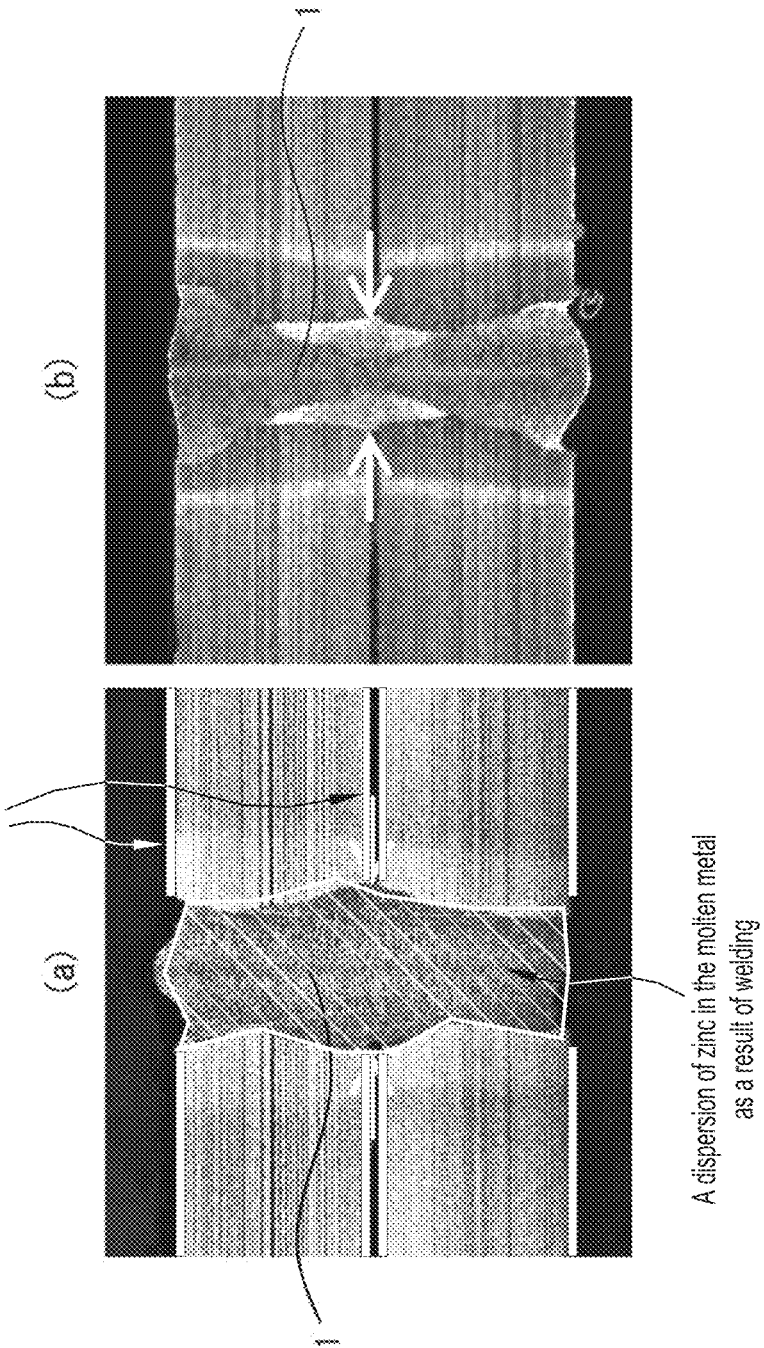

FIGS. 1(a) and 1(b) show images of cross-sectional photos of a weld zone formed by welding steel sheets by laser beam welding from the overlaid direction. The cross-sections are cross-sections obtained by cutting the steel sheets at planes parallel to the overlaid direction of the steel sheets and perpendicular to the direction of weld progression so as to include the laser welded weld zones. FIG. 1(a) is a cross-sectional photo of a weld zone of a weldable assembly comprised of steel sheets between which a zinc oxide layer is formed, while FIG. 1(b) is a cross-sectional photo of a weld zone of a weldable assembly comprised of steel sheets between which no zinc oxide layer is formed. The "width of the weld zone" means the width of the weld metal at the joined interface of the laser welded weld zone 1 indicated by the arrow marks of FIGS. 1(a) and 1(b).

From FIGS. 1(a) and 1(b), it will be understood that when welding by laser beam a weldable assembly comprised of steel sheets between which a zinc oxide layer is formed, the width of the weld metal at the joined interface of the weld zone 1 is enlarged compared with welding by laser beam a weldable assembly comprised of steel sheets between which no zinc oxide layer is formed. Further, when measuring the tensile shear strength of test pieces obtained by welding by a laser beam a weldable assembly comprised of steel sheets between which a zinc oxide layer is formed and test pieces obtained by welding by a laser beam a weldable assembly comprised of steel sheets between which no zinc oxide layer is formed, the test pieces obtained by welding by a laser beam a weldable assembly comprised of steel sheets between which a zinc oxide layer is formed were higher in tensile shear strength.

The present invention was made after further study through the above such process of study. Below, the welded joint and method of production of the same of the present invention will be successively explained further for necessary requirements and preferable requirements.

The method of production of the present invention is a method of production of a welded joint by arranging metal sheets overlaid and welding them by a laser beam from the overlaid direction, wherein the following steps are performed to expand the width of the molten metal at the joined interface:

(i) A step of forming a layer of a metal member with a boiling point higher than the melting point of a metal sheet at a scheduled welding location of the surface of the metal sheet, overlaying another metal sheet, and thereby forming a metal member layer between metal sheets (ii) A step of irradiating a laser beam from an overlaid direction of the metal sheets so that a region including the metal member layer melts to thereby weld them by the laser beam First, the method of forming a metal member layer between metal sheets of step (i) will be explained.

Figure 2:
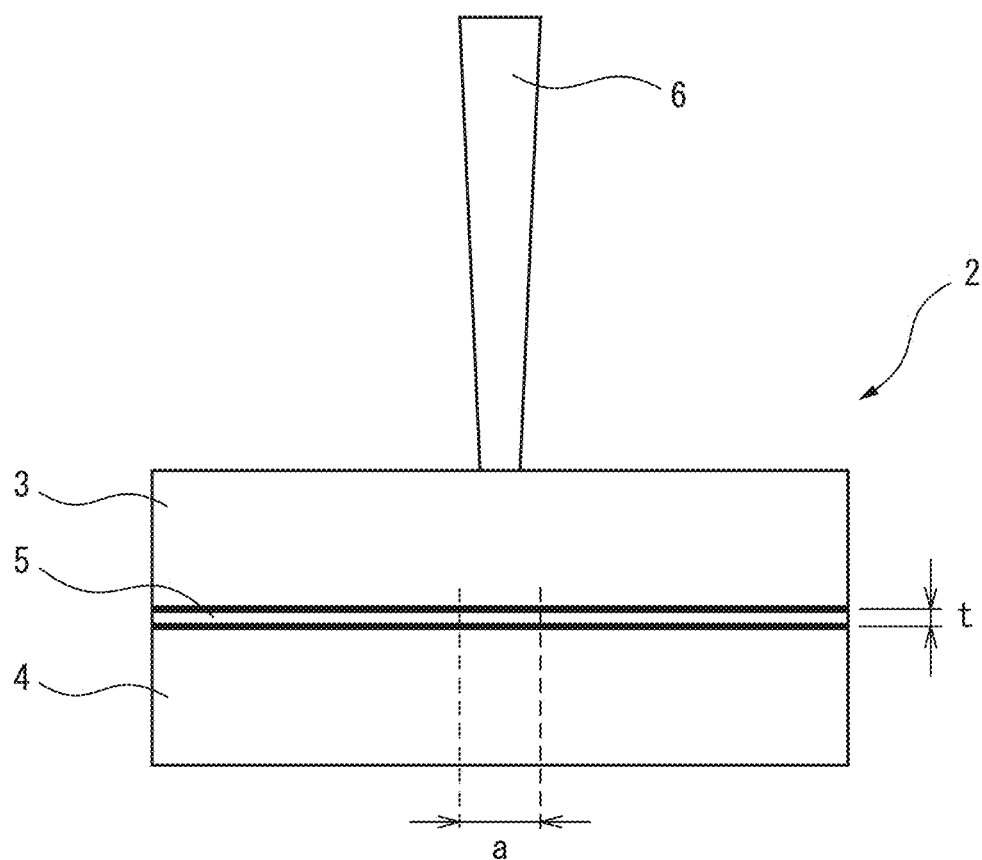
FIG. 2 is a view showing a weldable assembly comprising metal sheets between which a layer of a metal or metal compound is provided.

Weldable Assembly Comprised of Metal Sheets Between which Metal Member Layer is Provided Below, to simplify the explanation, a weldable assembly comprised of two metal sheet and having a metal member layer between the metal sheets will be explained using the drawings. As explained later, in the present invention, the number of metal sheets is not limited to two. FIG. 2 shows a weldable assembly comprised of metal sheets between which a metal member layer is provided. Note that, below, in the overlaid direction of the metal sheets, the side at which the laser is fired is defined as the "upper side" and the other as the "lower side".

As shown in FIG. 2, the weldable assembly 2 has a metal member layer 5 between the upper side metal sheet 3 and the lower side metal sheet 4. The upper side metal sheet 3 of the weldable assembly 2 is the surface which the laser beam 6 is fired at. The scan direction of the laser beam 6 is the direction from behind the paper on which the figure is drawn to in front of it. The location which is welded by the upper side metal sheet 3 and the lower side metal sheet 4 is the scheduled welding location "a".

FIG. 2 shows the case of forming the metal member layer 5 over the entire top surface of the lower side metal sheet 4. The metal member layer 5 need only be formed at least at the scheduled welding location "a" of the lower side metal sheet 4. The metal member layer 5 does not have to be formed over the entire top surface of the lower side metal sheet 4. However, the metal member layer 5 is formed also at scheduled welding locations in the direction of weld progression of the lower side metal sheet 4. When overlaying three or more sheets, it is sufficient that the metal member layer be formed at least at one overlaid surface of the same.

The thickness of the metal member layer is preferably made $0.06t^{1/2}-0.01$ (mm) or less when defining the total thickness of the overlaid metal sheets to be welded as "t" (mm). If the thickness of the metal member layer exceeds $0.06t^{1/2}-0.01$ (mm), blow holes easily form inside the weld metal of the joined interface. Further, to obtain the effect of expansion of the width of the weld metal of the joined interface of the present invention, the thickness of the layer is preferably 1 μm or more.

The length of the metal member layer 5 in the direction of weld progression (below, referred to as the "length of the metal member layer") preferably matches the length of the scheduled welding location in the direction of weld progression. Further, the length perpendicular to the direction of weld progression of the metal member layer 5 and parallel to the steel sheet surface (below, referred to as the "width of the metal member layer") is preferably made a width of the scheduled welding location "a" or more and 0.1 mm or more. If the width of the metal member layer is less than the width of the scheduled welding location "a" or is less than 0.1 mm, it becomes difficult to increase the width of the molten metal at the joined interface.

The metal member of the metal member layer 5 is not particularly limited so long as the boiling point is higher than the melting point of the metal sheets. If a metal member with a boiling point higher than the melting point of the metal sheets, in principle a similar effect can be achieved. For example, it may also be a non-stoichiometric oxide outside from the stoichiochemical composition. When the metal sheets are steel sheets, if considering the boiling point, it is preferable to use a metal oxide. In particular, zinc oxide is preferable.

Method of Forming Metal Member Layer

The method of forming the metal member layer 5 on the top surface of the lower side metal sheet 4 is not particularly limited. For example, it is possible to disperse a powder of the metal member in water or alcohol, coat it by a brush etc., then make it dry to form the layer. Further, when the metal member is a galvanized steel sheet, heat treatment enables the formation of a zinc oxide layer as well. Further, it is also possible to build up the metal member powder as it is and then laser weld it. It is also possible to build up the metal member powder, then heat treat it before laser beam welding. As the method of heat treatment, placement in a heating furnace, heating by a hot plate, direct contact of an arc, laser, infrared, or other heat source with the metal member, heating by high frequency induction heating, or other methods may be considered. Further, in the process of production of the metal sheets, it is possible to add a metal member to the surface of the metal sheets.

One example of the method of spreading the metal member powder on the top surface of the lower side metal sheet 4 to form the metal member layer 5 will be explained. When spreading the metal member powder on the top surface of the lower side metal sheet 4, to form a desired thickness of metal member layer 5, it is preferable to spread the powder after placing a thickness adjusting member at the part of the top surface of the lower side metal sheet 4 not for forming the metal member layer 5 or around the lower side metal sheet 4. The thickness adjusting member is, for example, a sheet shaped member of a predetermined thickness, a frame shaped member having an opening at a part corresponding to the region of formation of the metal member layer, etc.

Further, using a thickness adjusting member, the metal member powder was spread over the top surface of the lower side metal sheet 4 to form a metal member layer 5 of the desired thickness, the thickness adjusting member was removed, and the upper side metal sheet 3 was overlaid on the metal member layer 5 to form a weldable assembly 2 comprised of two metal sheets between which a metal member layer 5 is provided.

The particle size of the metal member powder used is not particularly limited and may be selected considering the work efficiency in spreading the powder. A primary particle size of 0.5 μm or less is preferable. Further, when using a metal member comprised of zinc oxide, for spreading the zinc oxide powder, for a width of the zinc oxide layer 0.6 mm and length of the zinc oxide layer of 100 mm, if making the thickness "t" of the zinc oxide layer 1 to less than 100 μm, in the case of zinc oxide powder of an average primary particle size of 0.025 μm, spreading 0.34 to 13.44 mg is illustrated.

Further, the type or chemical composition of the metal sheets is not particularly limited. The metal sheets should be made ones giving mechanical properties corresponding to the application. As the metal sheets, for example, steel sheets, aluminum alloy sheets, titanium alloy sheets, magnesium alloy sheets, etc. may be used. As the steel sheets, for example, galvanized steel sheets, aluminum plated steel sheets, hot stampings, bare steel sheets, etc. can be used. Further, the metal sheets are not particularly limited in thickness.

The present invention is most effective for metal sheets of thicknesses of 0.5 to 3.2 mm in range. Even if the sheet thicknesses are less than 0.5 mm, the effect of improvement of the welded joint strength of the weld zone is obtained, but the joint strength is affected by the sheet thicknesses, so the effect of improvement of strength of the joint as a whole becomes smaller and the range of application of the metal sheet member is limited. Further, even if the sheet thicknesses are over 3.2 mm, the effect of improvement of the welded joint strength of the weld zone is obtained, but from the viewpoint of lightening the weight of the metal sheet member, the range of application of the metal sheet member is limited.

The number of the overlaid metal sheets is not particularly limited. The method of production of the present invention is not limited to applications when overlaying two metal sheets for laser beam welding. It can also be applied to overlaying three or more metal sheets for laser beam welding. The metal sheets may be all the same in type, chemical composition, and thickness or may be different. Further, when overlaying three or more metal sheets for laser beam welding, a metal member layer may be formed between all of the metal sheets or may be formed between some of the metal sheets.

Form of Overlaid Part Forming Welded Joint

The metal sheets used for producing the welded joint need only be shaped with sheet-like parts forming the welded joint and need not be sheets as a whole. For example, flange parts of members press-formed into specific shapes with trapezoidal cross-sections etc. are also included. Further, the invention is not limited to joints formed from separate metal sheets. It may also be an overlay welded joint of a single metal sheet formed into a tubular shape or other predetermined shape and overlaid at its end parts.

Next, the method of welding the weldable assembly by a laser beam from the overlaid direction of the metal sheets of step (ii) will be explained.

Laser Beam Welding Machine

In the present invention, the laser beam welding machine used is not particularly limited. A conventional laser beam welding machine can be employed. A remote laser head can also be used for the laser beam welding machine. However, a remote laser head is expensive, so it is preferable to use a machine similar to a conventional laser beam welding machine.

A conventional laser beam welding machine is comprised of a laser oscillator, light path, focusing optical system, drive system, shield gas system, etc. As the laser oscillator, for example, a $CO_2$ laser, YAG laser, fiber laser, DISK laser, semiconductor laser, or other laser can be used. The laser beam emitted by the laser oscillator is guided over the light path to the focusing optical system. The focusing optical system is comprised of a parabolic mirror or condensing lens etc. and focuses the transmitted laser beam.

The focal position of the laser beam is variable, but, for example, is set on the top surface of the upper side metal sheet 3. Further, the focused laser beam is fired at the steel sheet for welding. Further, the drive system is made to move to make the welding progress. Further, a semiconductor laser in which light emitted from the oscillator is directly guided to the focusing optical system without using a light path may also be used. A shield gas may be used if necessary.

Laser Beam Welding Method

The laser beam welding method may be performed using the conditions of conventional laser beam welding other than welding a weldable assembly 2 comprised of metal sheets between which a metal member layer 5 is provided. For example, it is possible to use a conventional laser beam welding machine to weld a weldable assembly 2 comprised of steel sheets between which a metal member layer 5 comprised of a zinc oxide layer is provided under welding conditions of a laser output of 2 to 30 kW, a focused spot diameter of 0.1 to 1.0 mm, and a welding speed of 0.1 to 60 m/min.

Further, the keyhole formed in laser beam welding may be formed so as to pass through the lower side metal sheet 4. If not allowed to pass through the lower side metal sheet 4, the keyhole preferably reaches the lower side metal sheet 4. Further, the weld zone may be shaped not only as a straight line, but also a curve, circle, donut shape, etc.

By welding in this way, the metal member is caught up in the molten metal, but the boiling point of the metal member is higher than the melting point of the metal sheet, so the metal member will not immediately become a gas inside the molten metal. However, the inside of the keyhole and its surroundings will become further higher in temperature, so the metal member will become vaporized particles and, due to this, the pressure inside the keyhole will rise. As a result, the molten metal will be pushed out into the clearance between the metal sheets and the width of the molten metal at the joined interface can be made $0.6t^{1/3}+0.14$ (mm) or more where the total thickness of the overlaid metal sheets is "t" (mm), preferably can be greatly broadened over the widths of the weld metal at the front surface and back surface of the overlaid welded metal sheets. By broadening the width of the molten metal at the joined interface in this way, it is possible to obtain a laser welded joint improved in tensile shear strength.

As explained above, according to the present invention, it is possible to improve the tensile shear strength of the laser welded joint without using an expensive remote laser head, but using a usual laser welding machine. Further, since a metal member layer is provided, heat treatment becomes unnecessary, so the welding time is never made to increase. Furthermore, heat deformation by the heat treatment step can be suppressed, so the precision of the member is improved.

EXAMPLES

Next, examples of the present invention will be explained. The conditions in the examples are illustrations employed for confirming the workability and effects of the present invention. The present invention is not limited to these illustrations of conditions. The present invention can employ various conditions so long as not departing from the gist of the present invention and so long as achieving the object of the present invention.

Example 1

Two thickness 1.6 mm, 30 mm×100 mm steel sheets were prepared. On the top surface of one steel sheet, zinc oxide powder (ZnO) was spread to a thickness of 20 μm to form a zinc oxide layer. On this zinc oxide layer, the other steel sheet was overlaid to prepare a weldable assembly 1. Further, two steel sheets of similar dimensions were prepared. On the top surface of one steel sheet, rather than forming a zinc oxide layer, a thickness 20 μm thickness adjusting member was placed at a part not being welded. The other steel sheet was overlaid to prepare a weldable assembly 2 comprised of steel sheets between which a 20 μm clearance was provided. Note that two each of the weldable assemblies 1 and 2 were prepared for observation of the cross-sections of the weld zones and tensile shear tests after laser beam welding.

At the welding locations of the weldable assemblies 1 and 2, a YAG laser was used for welding 30 mm under welding conditions of a spot diameter of φ0.6 mm, a laser output of 4.5 kW, and a welding speed of 4.0 mm/min. Below, the welded weldable assemblies 1 and 2 will be respectively referred to as the Test Pieces 1 and 2.

Figure 3:
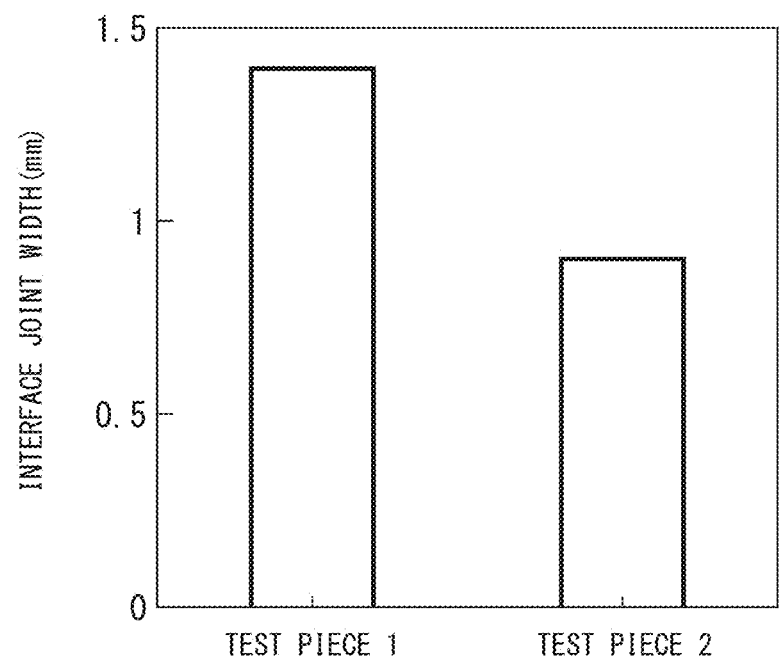
FIG. 3 is a view showing a relationship between presence of a zinc oxide layer and a width of a joined interface of a weld zone.

Next, the Test Pieces 1 and 2 were cut in parallel to the overlaid direction of the steel sheets including the weld zones for examining the cross-sections of the weld zones. At the cross-sections, the widths of the weld metal at the joined interfaces of the laser welded weld zones were measured. FIG. 3 shows the relationship between the presence of a zinc oxide layer and the width of the joined interface of the weld zone. From FIG. 3, the Test Piece 1 has a width of the joined interface of the weld zone of about 1.5 times the Test Piece 2.

The Test Piece 1 is comprised of steel sheets between which a zinc oxide layer is arranged, while the Test Piece 2 had a thickness adjusting member arranged at a part not a welding location. The intervals between the steel sheets of Test Pieces 1 and 2 are made the same, so the differences in widths of the joined interfaces of the weld zones in Test Pieces 1 and 2 are due to the action of the zinc oxide layer.

Figure 4:
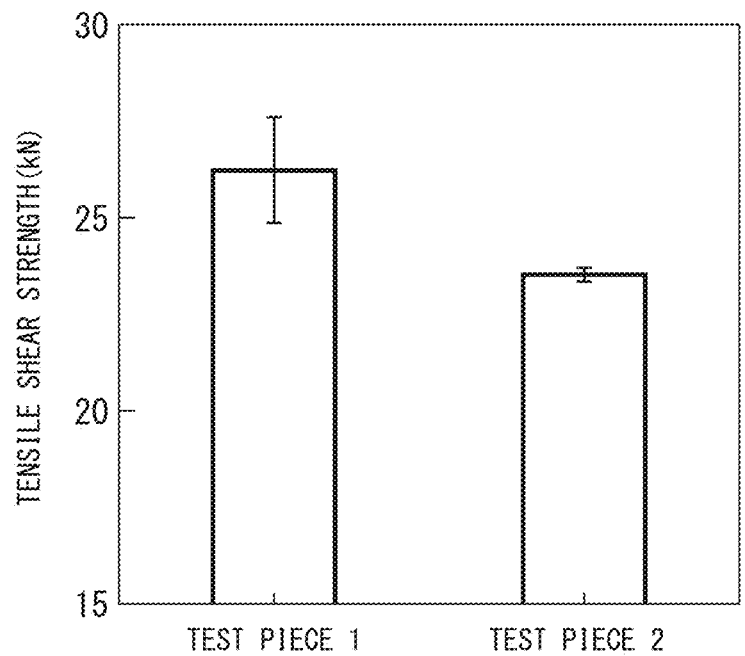
FIG. 4 is a view showing a relationship between presence of a zinc oxide layer and a tensile shear strength.

Next, Test Pieces 1 and 2 were subjected to tensile shear tests based on the tensile shear test method (JIS Z 3136). FIG. 4 shows the relationship between the presence of a zinc oxide layer and the tensile shear strength. From FIG. 4, the Test Piece 1 is improved in tensile shear strength by about 10% compared with the Test Piece 2.

As shown in FIG. 3 and FIG. 4, when the relationships of the presence of a zinc oxide layer with the width of the joined interface of the weld zone and the tensile shear strength are the same, that is, when there is a zinc oxide layer, the width of the joined interface of the weld zone and the tensile shear strength become larger, so in Test Piece 1, the tensile shear strength was improved due to the enlargement of the width of the joined interface of the weld zone. Further, the width of the joined interface of the weld zone was enlarged due to the zinc oxide vaporizing and the internal pressure rising near the joined interface in the keyhole and thereby the molten metal being pushed out to the overlaid parts.

Example 2

The effect of the thickness of the zinc oxide layer on the tensile shear strength was investigated. Test pieces were prepared in the same way as the Test Piece 1 except for making the thicknesses of the zinc oxide layers 1 μm, 20 μm, 40 μm, 50 μm, and 100 μm and were welded under similar laser welding conditions. Further, these test pieces were subjected by tensile shear tests based on JIS Z 3136.

Figure 5:
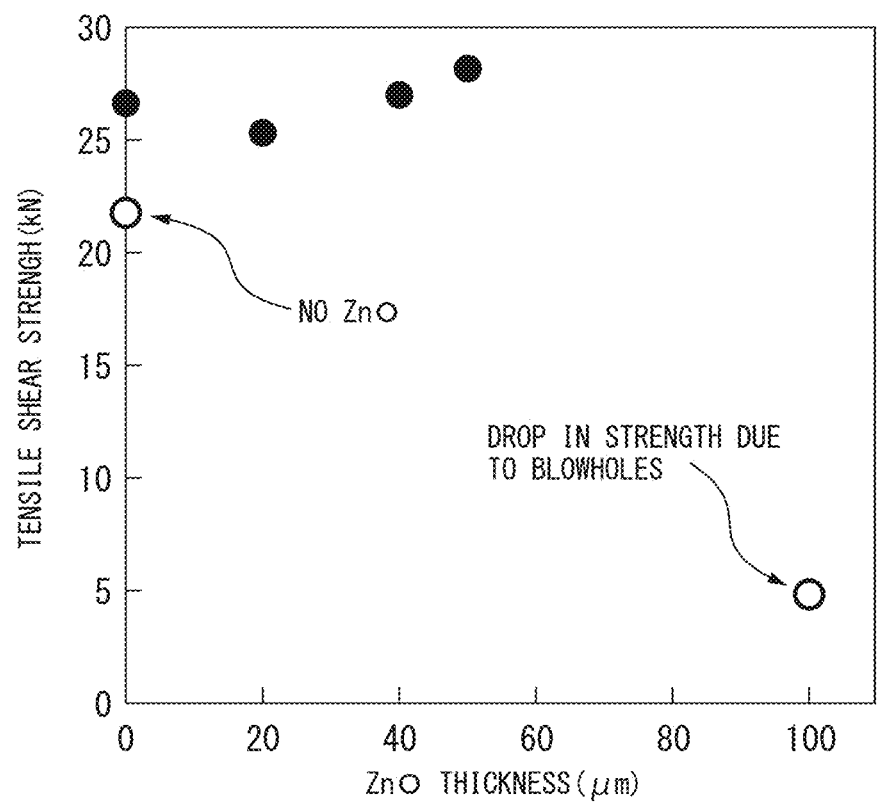
FIG. 5 is a view showing a relationship between a thickness of a zinc oxide layer and a tensile shear strength.

FIG. 5 shows the relationship between the thickness of the zinc oxide layer and the tensile shear strength. FIG. 5 also shows the relationship between the thicknesses of the zinc oxide layers of Test Pieces 1 and 2 and the tensile shear strength. From FIG. 5, test pieces with a thickness of the zinc oxide layer of 1 μm were improved in tensile shear strength from the Test Piece 2. However, test pieces with a thickness of the zinc oxide layer of 100 μm suffered from blow holes in the weld metal at the joined interface so fell in tensile shear strength compared with Test Piece 2.

INDUSTRIAL APPLICABILITY

According to the present invention, without using an expensive remote laser head, but using a usual laser welding machine, it is possible to improve the tensile shear strength of a laser welded joint without allowing the welding time to increase. Accordingly, the present invention is high in industrial applicability.

REFERENCE SIGNS LIST 1. weld zone
2. weldable assembly
3. upper side metal sheet
4. lower side metal sheet
5. metal member layer
6. laser
a. scheduled welding location
t. thickness of metal member layer

The invention claimed is:

1. A method of production of a laser welded joint obtained by arranging metal sheets overlaid and welding the metal sheets,
    the method of production of the laser welded joint including the step of vaporizing a layer consisting of zinc oxide of a thickness 1 μm to $0.06t^{1/2}-0.01$ (mm) with a boiling point higher than a melting point of the metal sheets at a joined interface of welding location of the metal sheets by irradiating a laser beam from an overlaid direction of the metal sheets, wherein "t" represents a total thickness of the metal sheets arranged overlaid, in units of mm, broadening the width of the molten metal at the joined interface by the vaporizing of the zinc oxide, larger than the widths of the weld metal at the front surface and back surface of the metal sheets welded overlaid.

2. The method of production of a laser welded joint according to claim 1, wherein the layer of zinc oxide is formed by coating a powder of zinc oxide.

* * * * *